United States Patent Office 3,161,671
Patented Dec. 15, 1964

3,161,671
PROCESS FOR PREPARING ACRYLONITRILE
Saburo Minekawa, Toshima-ku, Tokyo, Shohei Hoshino, Suginami-ku, Tokyo, and Atsushi Shibata and Naoya Kominami, Itabashi-ku, Tokyo, Japan, assignors to Asahi Kasei Kogyo Kabushiki Kaisha, Kita-ku, Osaka, Japan, a corporation of Japan
No Drawing. Filed Feb. 6, 1961, Ser. No. 87,075
Claims priority, application Japan Feb. 26, 1960
1 Claim. (Cl. 260—465.3)

This invention relates to the process for preparing acrylonitrile by a gas phase catalytic reaction of a gas mixture comprising propylene, ammonia and air or molecular oxygen over a catalyst. The object is to achieve the process, heretofore been considered impossible, by employing catalyst having satisfactory activity and selectivity, thereby producing acrylonitrile containing less impurity in good yield through a simplified process.

In the past, various attempts have been made to produce acrylonitrile by a gas phase catalytic reaction of propylene and ammonia and air or molecular oxygen; however, only acetonitrile or propionitrile resulted, and no acrylonitrile or only small amount of acrylonitrile was produced.

Hence, in the past, acrylonitrile has been produced from a suitable intermediate, such as acrolein and allylamine. Recently, the reaction was achieved by the employment of bismuth phosphotungstic acid as a catalyst.

As a result of research, we have already invented several catalysts which produce acrylonitrile in good selectivity and good yield by conducting the catalytic reaction of a gas mixture comprising propylene, ammonia and air over the catalyst at an elevated temperature.

This invention is based on the discovery of a novel catalyst which is effective in this reaction. The catalyst employed in this reaction is an oxidation catalyst comprising tungsten oxide or phosphotungstic acid and tellurium or tellurium oxide.

The catalyst employed has, as specifically described in the examples, a remarkable effect compared with the bismuth phosphotungstic acid series.

In the actual practice of the invention, the addition of a small amount of the salts of alkali metals to the catalyst is effective to control the by-production of carbon dioxide gas and hydrogen cyanide. Furthermore, the catalyst can be employed by itself or as an admixture with other substance or supported on it.

As a supporting substance, silica in various forms, alumina, diatomaceous earth, clay, porcelain clay, bentonite, etc., particularly silica, are desirable. In some instances of this invention, the pretreatment of supporting substance affects the efficiency of the reaction.

The composition of reaction gas employed in the production of acrylonitrile through the instant process can be varied over a wide range. The concentration of propylene which gives favorable results is about 10% and a good yield is obtained with the increase of the concentration of propylene when said concentration is less than 10%.

The mol ratio of ammonia to propylene which gives favorable results is from 1.0 to 2.0, and improvement of the yield cannot be expected when the ratio is more than 2.0.

It is effective for the improvement of selectivity of the catalyst and yield to mix steam in the reaction gas. Similar to a general gas phase oxidation reaction, gas which is inert under reaction conditions, such as nitrogen and propane, can be added to the reaction gas. In the practice of the instant process, the temperature employed is above 300° C. and below 480° C. The range between 350° C. and 450° C. is particularly desirable. The contact time of 0.1 to 20 seconds, particularly 4.5 to 18 seconds, is desirable.

The invention is further illustrated in the following examples.

Example 1

Silica gel, tungstic oxide and tellurium oxide are mixed together as powder having a particle size in the range of from 200 to 300 mesh in a weight ratio of 70 parts, 20 parts and 10 parts, respectively, and admixed with water to form paste.

The admixture is then molded as particles from 6 to 10 mesh and calcined for 4 hours at 400° C. while passing air thereover. 20 cc. of resultant catalyst are packed into a telex reaction tube having an inner diameter of 16 mm.

Quartz chips having the same size as the catalyst are added for dilution for their large heating value in the main reaction.

The reaction tube is dipped into a niter bath controlled at 400° C., and a gas mixture of 7.7% propylene, 8.0% ammonia and 84.3% air is prepared and passed through the tube at a rate of 133 cc./min.

When the reaction reaches a steady state, the sample of gas produced is analyzed by gas chromatography. The results are stated in the following table.

|  | Percent of conversion | Yield to the propylene consumed (percent) |
|---|---|---|
| Acrylonitrile | 30.0 | 47.7 |
| Acetonitrile | 5.0 | 7.9 |
| Acrolein | 0 | 0 |
| Carbon dioxide | 12.3 | 19.6 |
| Hydrogen cyanide | 6.0 | 9.6 |
| Carbon monoxide and others | 9.5 | 15.1 |

The result obtained employing the catalyst prepared by mixing silica gel and tungsten oxide in the proportion of 80 parts and 20 parts, then admixing with water to form a paste, molding, drying and effecting calcining treatment under the same reaction condition is stated in the following table for comparison.

| | Percent of conversion |
|---|---|
| Acrylonitrile | 0 |
| Acetonitrile | 0 |
| Carbon dioxide | 4.0 |
| Hydrogen cyanide | 2.0 |
| Percent of conversion of propylene | 6.0 |
| Percent of conversion of ammonia | 14.0 |

It is quite clear that acrylonitrile cannot be effectively produced by the employment of tungsten oxide per se. Therefore the combination with tellurium oxide is indispensable. The results obtained with a catalyst employing conventional bismuth oxide in place of tellurium oxide, namely: the one comprising 70 parts of silica gel, 20 parts of tungsten oxide and 10 parts of bismuth oxide, under the same reaction conditions is stated in the following table.

| | Percent of conversion |
|---|---|
| Acrylonitrile | 1.0 |
| Acetonitrile | 0.5 |
| Carbon dioxide | 2.8 |
| Hydrogen cyanide | 1.1 |
| Percent of conversion of propylene | 5.5 |
| Percent of conversion of ammonia | 15.0 |

The result clearly proves that the catalyst of this invention which is the combination of the tungsten-tellurium series is superior to that of the conventional one which is the combination of tungsten-bismuth series in its effect.

Example 2

Silica gel, ammonium phosphotungstic acid and tellurium oxide powder, having particle sizes in the range of from 200 to 300 mesh, are mixed together well in a proportion of 70 parts, 20 parts and 10 parts, respectively, and admixed with water for a long period of time. The product is molded as particles of from 6 to 10 mesh and calcined at 400° C. for 4 hours while passing air thereupon after drying.

20 cc. of the resulting catalyst is packed into a telex reaction tube having an inner diameter of 16 mm. Preprepared reaction gas comprising 7.7% propylene, 8.0% ammonia and 84.3% air is introduced into the reaction tube maintained at 400° C. at the flow rate of 133 cc./min.

After the reaction reaches a steady state, the composition of the produced gas is analyzed. The result is stated in the following table.

| | Percent of conversion | Yield to the propylene consumed (percent) |
|---|---|---|
| Acrylonirile | 36.5 | 51.1 |
| Acetronitrile | 5.3 | 7.4 |
| Acrolein | 2.1 | 2.9 |
| Carbon dioxide | 15.0 | 21.0 |
| Hydrogen cyanide | 4.0 | 5.6 |
| Carbon monoxide | 8.5 | 11.9 |

What we claim:

A process for preparing acrylonitrile which comprises contacting at a temperature of 300°–380° C. a gaseous mixture of propylene, ammonia and molecular oxygen-containing gas with a catalyst composed of a tungsten component selected from the group consisting of tungsten oxide and phosphotungstic acid and a tellurium component selected from the group consisting of tellurium and tellurium oxide.

References Cited in the file of this patent
UNITED STATES PATENTS

| 2,450,637 | Denton et al. | Oct. 5, 1948 |
| 2,450,678 | Marisic et al. | Oct. 5, 1948 |
| 2,904,580 | Idol | Sept. 15, 1959 |
| 3,009,943 | Hadley et al. | Nov. 21, 1961 |